United States Patent

[11] 3,585,637

[72] Inventors Clifford M. Jones
Waynesboro;
Charles E. Atkinson, Alexandria, both of, Va.

[21] Appl. No. 735,499
[22] Filed June 4, 1968
[45] Patented June 15, 1971
[73] Assignee General Electric Company

[54] KEYBOARD DETECTOR
15 Claims, 5 Drawing Figs.

[52] U.S. Cl. .......... 340/365, 340/146.1
[51] Int. Cl. .......... G08c 9/04
[50] Field of Search .......... 340/365, 345; 178/17, 17 A, 17 C, 347

[56] References Cited

UNITED STATES PATENTS

| | | | |
|---|---|---|---|
| 3,160,875 | 12/1964 | Bernard | 340/347 |
| 3,192,520 | 6/1965 | Marette | 340/347 |
| 3,210,734 | 10/1965 | Andrews | 340/347 |
| 3,308,918 | 4/1967 | James | 178/17 C |
| 3,457,368 | 7/1969 | Houcke | 340/365 |

OTHER REFERENCES

IBM TECHNICAL DISCLOSURE BULLETIN, "Keyboard Circuit." L. G. Lankford, Vol. 9 No. 6, Nov. 1966 pp 586, 587

*Primary Examiner*—Thomas B. Habecker
*Attorneys*—Lawrence G. Norris, Michael Masnik, Stanley G. Corwin, Frank L. Neuhauser and Oscar B. Waddell

ABSTRACT: Individual magnetic cores are associated with keys on a keyboard, and two sets of electrical conductors are threaded through the cores in opposite senses to provide code and inverse code signals. Circuit means is provided to detect a change in logic levels caused by simultaneous depression of two or more keys and to produce a data strobe output only when a single key is depressed.

INVENTOR.
CLIFFORD M. JONES
CHARLES E. ATKINSON
BY Michael Masnik
THEIR ATTORNEY INVENTOR.
CLIFFORD M. JONES
CHARLES E. ATKINSON
BY Michael Masnik
THEIR ATTORNEY

KEYBOARD DETECTOR

BACKGROUND OF THE INVENTION

The present invention is directed to a keyboard system and more particularly to a control system for detecting the simultaneous depression of two or more keys on the keyboard.

In the information processing field the use of digital coding schemes has become an acceptable method and means for transmitting information by and between devices such as remote terminals, computers, telephone lines, or other similar devices. In most information processing systems, the information to be processed is generally introduced into the system from a keyboard which translates the information into an appropriate digital code. Externally, the keyboard appears much like the keyboard of a typewriter. Internally the keyboard undergoes a translation or encoding process whereby actuation of a key causes the generation of a digital code peculiar to the character or legend on the key.

Recent advances in keyboard translation systems have seen this conversion process accomplished by the use of electromagnetic coupling and electrical conductors selectively threaded through magnetic circuits to provide a desired pattern representative of a digital coding scheme. Thus by one scheme, the keyboard has a plurality of selectively individually operable keys, with each key representing a different character, legend, or other unique item of information. Depression of a key completes a magnetic circuit with a magnetic core positioned adjacent each key. Electrical conductors thread the cores in combinations to provide a digital code, with the threading pattern being unique for each key representing a particular information code representative of a separate encoded item of information.

While such keyboards have been found to be efficacious, a problem arises when two or more keys are simultaneously depressed. If this situation occurs, two or more binary codes will be generated simultaneously and the transmission of the proper digital code to the information processor receiving data information from the keyboard will be erroneous. The present invention is concerned with a keyboard detection system for detecting the simultaneous depression of two or more keys and for inhibiting the sending of erroneous digital codes thereby produced by the two keys down condition.

SUMMARY OF THE INVENTION

Briefly stated, in accordance with one aspect of our invention, a detector circuit for detecting the simultaneous depression of more than one key on a keyboard comprises: a plurality of individually operable keys on said keyboard; a plurality of magnetic cores operatively associated with said keys; a first set of electrical conductors threading said cores in combinations according to a first digital code; a second set of electrical conductors threading said cores in a sense different from the threading of said first set of electrical conductors to provide a second digital code different from said first digital code; and circuit means interconnected to said first and second sets of electrical conductors and operative to detect a code change over at least one of said sets of electrical conductors caused by simultaneous depression of at least two keys. In one form, said second set is threaded in a sense opposite to said first set, whereby said second digital code is the inverse of said first digital code, and said circuit means detects simultaneous code and inverse code changes in said respective sets and inhibits the strobing of digital code signals when at least two keys are depressed.

BRIEF DESCRIPTION OF THE DRAWINGS

Other features and advantages of the invention will further become apparent hereinafter and in the accompanying drawings, in which like reference numerals identify like components, and in which.

DETAILED DESCRIPTION OF THE INVENTION

Figure 1:
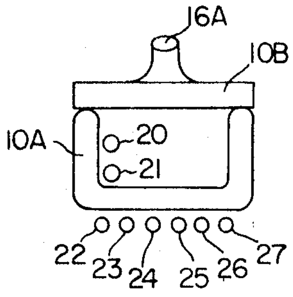
FIG. 1 is a schematic drawing of a portion of a keyboard showing the magnetic cores and the threading of sets of electrical conductors through the cores.

As shown in FIG. 1, three ferrite type magnetic cores 10, 12 and 14 are provided, each in two discrete parts. Each magnetic core consists of a bottom portion depicted as the "U" cores 10A, 12A, and 14A, and a top portion depicted by "I" bars represented by the numerals 10B, 12B and 14B. Each "I" bar is secured to an individual key 16 on the keyboard, which key represents a unique character, legend or item of information. The use of ferrite cores in two discrete parts allows for the opening and closing of the magnetic path by separation and mating of a "U" core with an "I" bar. Closure of the magnetic path by depression of a key will cause established magnetic flux lines to flow through the mating cores. Opening of the magnetic path by release of a key introduces a substantial air gap in the magnetic path in the regions at the terminal portions of the "I" bars. The magnetic flux lines which flow through mating cores may be produced by providing a drive line 20 which links each "U" core on the keyboard, and by supplying current pulses over the drive line 20 to cause flux lines to be magnetically induced through mating cores.

The generation of digital codes peculiar to each item of information may be achieved by providing a first set of electrical conductors, or sense lines 21—27 which thread the cores in combinations to provide a different code for each item of information. By way of example the seven sense lines 21—27 generate a seven bit code. According to the coding scheme the binary level "1" is represented by a sense line that is threaded through a core and the binary level "0" is represented by a sense line running around a core and thus not coupled to the drive line 20. Each sense line represents a certain binary value in the coding scheme, and hence each of the lines 21—27 passes through some cores and around others. For example, in FIG. 1, only the sense line 21 passes through the core 10. If sense line 21 represents the lowest binary value, then depression of the key 16A and energization of drive line 20 with a current pulse will cause a signal to be induced only over the sense line 21 and the digital code for key 16A will be the value 1. The number and weight of the sense line(s) that pass through each core determine the digital code produced for that core. The digital code is generated for each item of information by depression of a key which causes closure of the air gap between the "I" bar and "U" core. Then, the current pulses over drive line 20 will cause the magnetic flux lines produced by the drive line to flow through the magnetic path completed by the "I" bar and "U" core. These magnetic flux lines induce a voltage in the sense lines which are threaded through the core.

Figure 2:
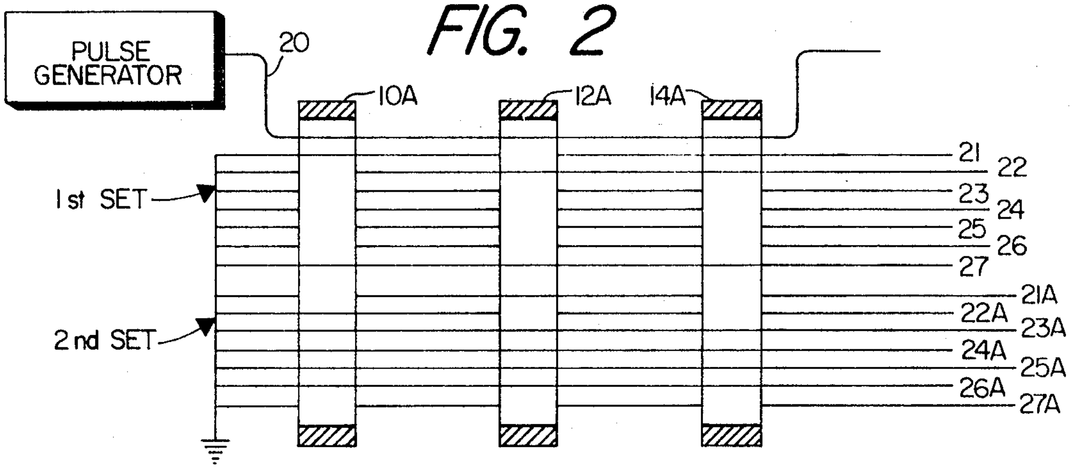
FIG. 2 is a schematic drawing showing one form of the threading scheme provided by the invention.

FIG. 2 discloses one form of threading the cores which may be provided in a two keys down detector system. As shown in FIG. 2, a first set of electrical conductors or sense lines 21—27 threads the cores in combinations to provide a digital code as hereinbefore described. A second set of electrical conductors or sense lines 21—27A threads the cores in a sense which is opposite to the threading scheme of the first set of electrical conductors 21—27. Hence, sense line 21 of the first set threads through the core 10, around core 12 and through core 14, while associated sense line 21A of the second set is threaded around the core 10, through core 12 and around core 14 to provide a sense opposite to that of the sense line 21.

Figure 3:
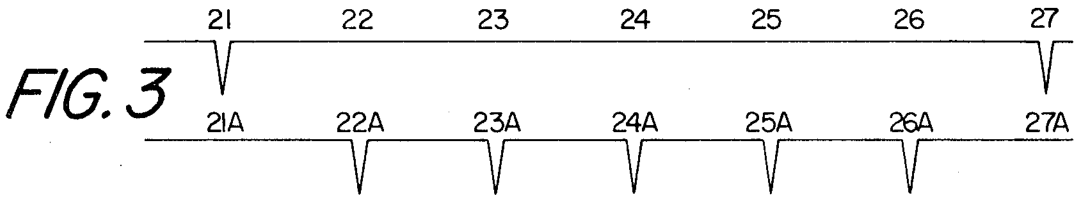
FIG. 3 shows a typical digital code and inverse code provided when a single key is depressed.

Similarly, sense line 22 of the first set threads around core 10, through the core 12, and through core 14; associated sense line 22A of the second set threads through core 10, around core 12 and around core 14 to provide a sense opposite to that of the sense line 22. Each sense line of the first set of electrical conductors 21—27 is associated with a sense line 21A—27A of the second set of electrical conductors. The sense lines of the first set of electrical conductors provide the true digital code for each key 16 that is depressed, while the sense lines of the second set of electrical conductors provide the the inverse of the digital code provided by the sense lines of the first set. FIG. 3 shows a typical digital code and inverse code provided by the respective sets of sense lines when a single key 16 is depressed. Each impulse represents the binary level "1" for the sense lines threaded through the core and the absence of an impulse represents the binary level "0" for the sense lines threaded around the core.

Figure 4:
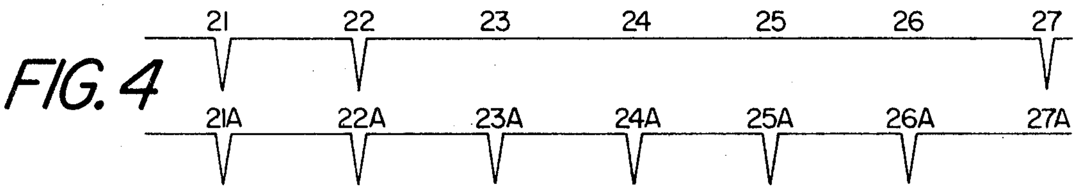
FIG. 4 shows a changed digital code and inverse code provided when more than one key is depressed.

FIG. 4 shows a typical changed code and inverse code produced when more than one key is depressed. As shown in FIG. 4, the code and inverse codes produced by the sets of conductors 21—27 and 21A—27A have changed logic levels due to the simultaneous depression of the keys 16A and 16B at core 10 and core 12. By depressing key 16A the binary level "1" is established over sense lines 21 and 22A, and by depressing key 16B the binary level "1" is established over the sense lines 21A and 22. This two keys down condition has caused erroneous code and inverse code levels to be generated during the time when both keys are simultaneously depressed, since the digital code for the item of information represented by the Key 16A should have a binary level "0" over sense line 22 and a binary level "0" over sense line 21A, and the digital code for the item of information represented by the key 16B should have a binary level "0" over sense line 22A.

Figure 5:
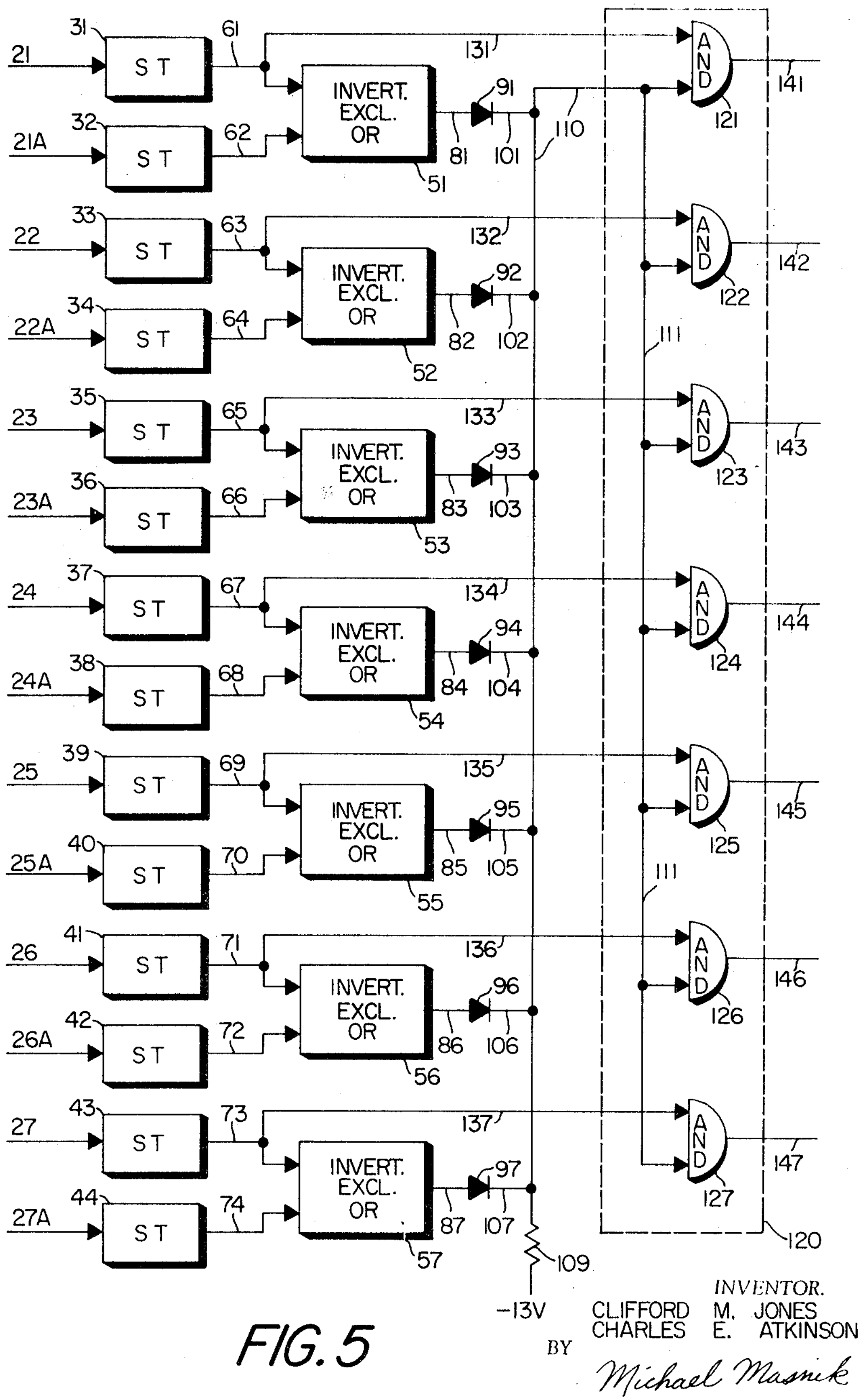
FIG. 5 is a schematic drawing showing circuit means for detecting the two or more keys down condition and for inhibiting the data strobing.

As shown in FIG. 5 each of the sense lines 21—27 of the first set, and its associated sense line 21A—27A of the second set are intercoupled to an input of individual Schmitt Trigger circuits depicted by the numerals 31—44 inclusive. Each Schmitt Trigger circuit 31—44 is a regenerative bistable circuit which squares and amplifies the voltage established over the sense lines. The output from each of the circuits 31—44 may be at −12 volts for a binary level "1" input from the sense line and may be at 0 volts for a binary level "0" input.

The thusly modified output signals from a pair of associated sense lines may be intercoupled to inputs of individual gate circuits 51—57. By way of example the modified output derived from sense line 21 is applied over conductor 61 from Schmitt Trigger 31 to one input of gating circuit 51, and the modified output derived from associated sense line 21A is applied over conductor 62 from Schmitt Trigger 32 to the other input of gating circuit 51. In a like manner, conductors 63 and 64 apply the modified outputs from associated sense lines 22 and 22A respectively to first and second inputs of gating circuit 52. Similarly, each of the conductors 65—66, 67—68, 69—70, 71—72, and 73—74 apply modified outputs from associated sense lines 23 and 23A, 24 and 24A, 25 and 25A, 26 and 26A, and 27 and 27A respectively to first and second inputs of gating circuits 54, 55, 56 57 respectively.

Each of the gate circuits 51—57 may consist of an exclusive OR gate inverted to provide compatibility with the specific logic scheme utilized. Each OR gate provides a strobe output over respective conductors 81—87 when one input is at the binary level "0" and the other input is at the binary level "1." The strobe output may be at a first level of −31 volts, and indicates that the code and inverse code signals for the associated pair of sense wires have been generated by depression of a single key. However, any one of the OR gates 51—57 will provide a STROBE output which may be at a second level of zero volts when the inputs to that OR gate are either both at the binary level "1" or both at the binary level "0." Due to the code and inverse code scheme this condition can only occur when at least two keys are simultaneously depressed since, as hereinbefore described, depression of two or more keys results in a code change for at least one bit. Each of the output conductors 81—87 may be connected to the anode of respective diodes 91—97, and the cathode of diodes 91—97 may be connected to one terminal of respective conductors 101—107. The other end of conductor 101—107 may be connected to a common conductor 110, which has one end coupled to −13 volts through pull down resistor 109. In this manner diodes 91—97 and resistor 109 comprise a seven input AND gate with an output over conductor 110 (i.e., −13 volts) only when all OR outputs are "1" which occurs only when a single key is depressed or when no key is depressed. When more than one key is depressed the output 110 will be at 0 volts.

Also depicted in FIG. 5 is character gating means 120 which may consist of a plurality of AND gates 121—127, equal in number to the number of data code lines in each set of electrical conductors. One input of each AND gate may be connected to the strobe output line by means of common conductor 110. The other input to each AND gate may be intercoupled to an output derived from first set of sense lines 21—27, by interconnecting conductors 131—137 to respective outputs of Schmitt Trigger circuits 31,33, 35, 37, 39, 41 and 43. In this manner character gating means 120 will receive the digital code generated over first set of sense lines 21—27 and will pass said code over conductors 141—147 in response to presence of the code over conductors 131—137 and a strobe signal over conductor 110. When a STROBE signal, indicative of depression of more than one key, is present, the digital code will not be passed since the inputs to each AND gate 121—127 will be at different levels.

While only a particular embodiment of the invention has been fully described and illustrated, it is apparent that modifications and alterations may be made therein. Hence, it is the intention in the appended claims to cover all such modifications and alterations as may fall within the true spirit and scope of the invention.

What we claim and desire to be secured by Letters Patent of the United States is:

1. A detector circuit for detecting the simultaneous depression of more than one key on a keyboard, comprising:
- a plurality of individually operable keys on said keyboard;
- a plurality of magnetic cores operatively associated with said keys;
- a first set of electrical conductors threading said cores in combinations according to a first digital code;
- a second set of electrical conductors threading said cores in a sense different from the threading of said first set of electrical conductors, according to a second digital code different from said first digital code; and
- means responsive to depression of any one key for causing said magnetic cores to develop a first digital code signal in said first set of conductors and a second digital code signal in said second set of conductors identifying said one key depression, means for utilizing at least one of said first and second code signals, means responsive to depression of a second key while said first key is effectively depressed for modifying at least one of said first and second digital code signals, and means for inhibiting said utilization of said signals in response to said modified set of signals.

2. Apparatus according to claim 1 further comprising further means responsive to release of the last to release of said keys for developing first digital code signals and second digital code signals identifying said last to release key, and means for utilizing at least one of said last named first and second digital code signals.

3. The invention defined in claim 2 and further comprising character gating means for receiving first digitally coded signals generated over said first set of electrical conductors, and means responsive to said developed first and second digital code signals corresponding to depression of a single key for issuing a strobe signal to said character gating means to advance said first digital code signals.

4. A control circuit for detecting the simultaneous depression of two or more keys on a keyboard, comprising:

a plurality of individually operable keys on said keyboard;
a plurality of magnetic cores operatively associated with said keys;
a first set of electrical conductors threading said cores in combinations according to a digital code;
a second set of electrical conductors threading said cores in a sense opposite to the threading of said first set of electrical conductors to provide the inverse of the digital code provided by said first set; and
circuit means interconnected to said first and second sets of electrical conductors and operative in response to depression of a single key to develop code and inverse code signals, and operative in response to depression of more than one key to develop a code change in the signals of at least one of said sets of electrical conductors.

5. The invention defined in claim 4 wherein said circuit means includes a plurality of gating circuits equal in number to the number of sense lines in a set of electrical conductors.

6. The invention defined in claim 5 wherein said circuit means includes means for applying a code signal from a conductor of said first set and an associated inverse code signal from a conductor of said second set to an individual gating circuit, the output of said gating circuits being at a first level when a single key is depressed, and the output of at least one gating circuit being at a second level when at least two keys are depressed.

7. The invention defined in claim 5 and further comprising character-gating means for receiving the digital code signals generated by said first set of electrical conductors, and means intercoupled to said gating circuits and said character gating means and responsive to said developed signals for strobing said digital code signals when a single key is depressed and for inhibiting said digital code signals when at least two keys are depressed.

8. A control system for detecting the simultaneous depression of two or more keys on a keyboard, comprising:
a plurality of individually operable keys on said keyboard;
a magnetic core for each key, each core having an air gap;
means operable by each key to close an air gap and complete the magnetic circuit within the core adjacent the operated key when the key is operated;
a first set of electrical conductors threading said cores in combinations according to a digital code;
a second set of electrical conductors threading said cores in a sense opposite to said first set of electrical conductors to provide the inverse of the digital code provided by said first set of electrical conductors;
means for simultaneously generating a magnetic field in said cores; and
circuit means intercoupled to said first and said second sets of electrical conductors, and operative in response to depression of a single key to develop code and inverse code signals in respective ones of said sets of conductors, and operative in response to depression of more than one key to develop simultaneous code and inverse code signal changes in respective ones of said sets of conductors.

9. A signal processing arrangement comprising a plurality of symbol keys on a keyboard, means for depressing said keys to establish a unique binary coded signal representative of the symbol associated with each of the depressed keys, means for translating an established binary coded signal only when one of said keys has been depressed, means responsive to more than one key being depressed to inhibit translation of any established binary coded signal associated with said depressed keys but responsive to the last-to-be-released key for translating the established binary coded signal associated with said last-named key.

10. A signal processing arrangement comprising a plurality of symbol keys on a keyboard, means for depressing said keys to establish a unique coded signal representative of the symbol associated with each of the depressed keys, means for translating an established coded signal only when one of said keys has been depressed, means responsive to more than one key being depressed to inhibit translation of any established coded signals associated with said depressed keys but responsive to the last-to-be-released key for translating the established coded signal associated with said last-named key.

11. A signal processing arrangement for a printer of the type employing a plurality of individually operable symbol keys on a keyboard, a magnetic circuit associated with each key and normally in an unmodified state, means responsive to the operation of each key to modify its associated magnetic circuit to a modified state, means responsive to said magnetic circuits assuming a modified state associated with the simultaneous operation of more than a single key for disabling printout of the symbol associated with each key until only one key remains depressed, and means responsive to the last-to-be-released key for enabling the printout of the symbol associated with said last-named key.

12. In combination, a plurality of individually operable symbol keys on a keyboard, a magnetic circuit associated with each key and normally in an unmodified state, means responsive to the operation of a key to modify its associated magnetic circuit to a modified state representative of the symbol associated with the operated key, means responsive to said magnetic circuits assuming a modified state associated with the simultaneous operation of more than a single key for disabling utilization of said modified state representation until all keys are released except one which last remains depressed, and means responsive to said magnetic circuits assuming a modified state associated with the symbol of said remaining key for enabling utilization of said last-named modified state representation.

13. A signal processing arrangement for a printer of the type employing a plurality of individually operable symbol keys on a keyboard, a plurality of magnetic circuits operatively associated with each key and normally in an unmodified state, a first set of electrical conductors coupled to said magnetic circuits in a manner to provide a binary coded signal representative of the symbol associated with a depressed key, a second set of electrical conductors coupled to said magnetic circuits in a manner to provide a second binary coded signal representative of a depressed key, said first and second signals having an inverted relationship in response to the depressing of a single key, means responsive to said first and second signals having said inverted relationship to enable printout of the symbol associated with the depressed key, means responsive to more than one key being simultaneously depressed to modify said first and second signals such that they have a noninverted relationship, means responsive to said noninverted relationship first and second signals for inhibiting printout of symbols associated with the simultaneously depressed keys, and means responsive to said first and second signals returning to said inverted relationship upon release of all by one of said keys to enable printout of the binary coded signals associated with said one of said keys.

14. In combination, a plurality of individually operable symbol keys on a keyboard, a plurality of magnetic circuits operatively associated with each key and normally in an unmodified state, a first set of electrical conductors coupled to said magnetic circuits in a manner to provide a coded signal representative of the symbols associated with a depressed key, a second set of electrical conductors coupled to said magnetic circuits in a manner to provide a second binary coded signal representative of a depressed key, said first and second signals having a first relationship in response to the depressing of a single key, means responsive to said first and second signals having said first relationship to enable printout of the symbol associated with the depressed key, means responsive to more than one key being simultaneously depressed to modify said first and second signals such that they have a different relationship, means responsive to said different relationship first and second signals for inhibiting utilization of signals associated with the simultaneously depressed keys, and means responsive to said first and second signals returning to said first relationship upon release of all but one of said keys to enable utilization of the signals associated with said one of said keys.

15. In combination, a plurality of individually operable symbol keys on a keyboard, signal means associated with each key and normally in an unmodified state, means responsive to the operation of a key to modify its associated signal means to a modified state representative of the symbol associated with the operated key, means responsive to said signal means assuming a modified state associated with the simultaneous operation of more than a single key for disabling utilization of the said modified state representation until all keys are released except the one which last remains depressed, and means responsive to said signal circuits assuming a modified state associated with the symbol of said one key for enabling utilization of the modified state representation corresponding to said one key remaining last depressed.

UNITED STATES PATENT OFFICE
CERTIFICATE OF CORRECTION

Patent No. 3,585,637 Dated June 15, 1971

Inventor(s) Clifford M. Jones and Charles E. Atkinson

It is certified that error appears in the above-identified patent and that said Letters Patent are hereby corrected as shown below:

Column 1, line 35, before "representing" insert -- and --. Column 2, line 68, cancel "21" and insert -- 21A --. Column 3, line 10, cancel "the" (second occurrence); line 34, after "line" insert -- 21 and a binary level "0" over sense line --; line 44, cancel "0" (first occurrence) and insert -- zero (0) --; line 60, after "56" insert -- and --; line 63, cancel "strobe" and insert -- strobe --; line 66, cancel "31" and insert -- 13 --; line 70, cancel "STROBE" and insert -- STROBE --. Column 4, line 5, cancel "conductor" and insert -- conductors --; line 55, after "second" insert -- digital --. Column 6, line 51, cancel "by" and insert -- but --.

Signed and sealed this 25th day of April 1972.

(SEAL)
Attest:

EDWARD M.FLETCHER,JR.
Attesting Officer

ROBERT GOTTSCHALK
Commissioner of Patents